US012599998B2

(12) United States Patent
Yoon et al.

(10) Patent No.: US 12,599,998 B2
(45) Date of Patent: Apr. 14, 2026

(54) APPARATUS AND METHOD FOR STEP-WISE SPINDLE DIAGNOSIS FOR MACHINING CENTER WITH DIFFERENT TOOLS LOADED

(71) Applicant: ELECTRONICS AND TELECOMMUNICATIONS RESEARCH INSTITUTE, Daejeon (KR)

(72) Inventors: Sung Jae Yoon, Daejeon (KR); Munyoung Lee, Daejeon (KR); Seung Hyub Jeon, Daejeon (KR); Jung-Chan Na, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 386 days.

(21) Appl. No.: 18/346,546

(22) Filed: Jul. 3, 2023

(65) Prior Publication Data

US 2024/0173809 A1     May 30, 2024

(30) Foreign Application Priority Data

Nov. 24, 2022     (KR) ......................... 10-2022-0159030

(51) Int. Cl.
| | |
|---|---|
| *G06F 11/30* | (2006.01) |
| *B23Q 3/155* | (2006.01) |
| *B23Q 5/58* | (2006.01) |
| *G01M 99/00* | (2011.01) |

(52) U.S. Cl.
CPC .............. *B23Q 5/58* (2013.01); *B23Q 3/155* (2013.01); *G01M 99/005* (2013.01); *B23Q 2003/15586* (2013.01)

(58) Field of Classification Search
CPC ...................................................... B23Q 5/58
See application file for complete search history.

(56) References Cited

U.S. PATENT DOCUMENTS

| | | | |
|---|---|---|---|
| 2012/0257556 A1 | 10/2012 | Jung et al. |
| 2018/0302784 A1 | 10/2018 | Lee et al. |

FOREIGN PATENT DOCUMENTS

| | | | |
|---|---|---|---|
| JP | 2019093463 A | | 6/2019 |
| JP | 2020062737 | * | 4/2020 |
| JP | 2020062737 A | | 4/2020 |
| JP | 7316489 B2 | | 7/2023 |
| KR | 1020160079372 A | | 7/2016 |
| KR | 10-2238754 B1 | | 4/2021 |

(Continued)

*Primary Examiner* — Phuong Huynh
(74) *Attorney, Agent, or Firm* — Rabin & Berdo, P.C.

(57) ABSTRACT

The present invention relates to verifying the suitability of a tool and diagnosing a spindle for a machining center on which different tools are mounted. Provided are a machining center spindle diagnosis apparatus and method configured to monitor a change of a tool in the machining center; when the change of the tool is recognized, control the machining center to idle the spindle; acquire sensor data from a sensor installed on the machining center during the idling of the spindle; input the acquired sensor data to a tool verifying model pre-trained by a machine learning technology to verify suitability of the tool; and when the tool is verified to be suitable, inputting the acquired sensor data to a spindle diagnosing model pre-trained by the machine learning technology to diagnose an operating state of the spindle.

19 Claims, 7 Drawing Sheets

(56)         References Cited

FOREIGN PATENT DOCUMENTS

| KR | 1020210067472 | A  | 6/2021 |
| KR | 10-2301201 | B1 | 9/2021 |
| KR | 10-2022-0055160 | A  | 5/2022 |

* cited by examiner

START

10 — LOAD, BY OPERATOR, TOOL ON TURRET IN ORDER AND ASSIGN NC CODE TO MACHINING CENTER

20 — EXECUTE NC CODE AND OPERATE MACHINING TOOL

30 — IS TOOL CHANGED?    NO / YES

40 — IDLE SPINDLE FOR 10 SECONDS AND ACQUIRE OPERATING DATA

50 — CALL TOOL VERIFYING MODEL

60 — INFER TOOL VERIFYING MODEL

70 — IS TOOL SUITABLE?    NO / YES

80 — INFER SPINDLE DIAGNOSING MODEL

90 — VISUALIZE RESULT OR ALARM IT

END

COMPUTER SYSTEM

APPARATUS AND METHOD FOR STEP-WISE SPINDLE DIAGNOSIS FOR MACHINING CENTER WITH DIFFERENT TOOLS LOADED

CROSS-REFERENCE TO RELATED APPLICATION

This application claims priority to and the benefit of Korean Patent Application No. 10-2022-0159030, filed on Nov. 24, 2022, the disclosure of which is incorporated herein by reference in its entirety.

BACKGROUND

1. Field of the Invention

The present invention relates to a machining center, and more particularly, to a spindle diagnosis apparatus and method for a machining center where different tools are loaded and used.

2. Discussion of Related Art

A machining center is a machine that processes a material to create various desired shapes. A machining center includes a computer numerical control (CNC) that performs numerical control by a computer to automatically operate according to codes, a rotary component (e.g., spindle) that processes workpieces while loading and rotating workpieces or tools, a turret or a tool changer on which one or more tools are loaded or mounted, a feed system that moves workpieces and tools to accurate locations, etc.

Initially, a machining center was developed with a focus on mass production in which a specific tool is loaded or mounted on a spindle and continuously operated for a long time. Recently, however, with the increase in small quantity batch production of multiple products, a single machining center is using a technology that automatically changes tools sequentially and processes the tools. To this end, an operator needs to load tools to be used on a turret or a tool changer in order, in advance.

The machining center using a turret or a tool changer is suitable for small quantity batch production of multiple products, but has the following problems in terms of spindle state diagnosis.

First, even if an inappropriate tool is mounted, an operator may not be aware of it. The operator needs to load a tool on a turret or a tool changer according to the machining sequence. Even if the tool is loaded incorrectly by mistake during the process, it is difficult for the operator to be aware of it in advance. This is because the machining center normally performs machining as long as specifications between the tool and the spindle are met. When a tool that is not suitable for current machining is loaded, the quality of a workpiece may be lowered or the spindle may be damaged due to an excessive load during the machining. Therefore, before machining, it is necessary to verify that the tool currently mounted on the spindle is suitable.

Second, a state diagnosis result of the spindle is different depending on the tool. Conventionally, in order to diagnose the state of the spindle, a method of collecting vibration data after attaching an acceleration sensor or a vibration sensor to the spindle and analyzing the collected data, has been used. In order to implement such technology, vibration data patterns measured when mechanical components, such as bearings, in the spindle are in a specific state (imbalance, wear, seizure, etc.) need to be stored in advance. That is, there is a problem in that prior data obtained by manufacturers of the machine components through various experiments is required, and is difficult to apply to a spindle with other machine components. In addition, when the type of tool is changed, the accuracy of the state diagnosis result is further lowered.

SUMMARY OF THE INVENTION

Therefore, in order to solve the conventional problem, the present invention is directed to diagnosing a state of a spindle in consideration of characteristics of each tool in a machining center with different tools loaded or mounted.

In order to solve the above problems, the present invention proposes a multi-step diagnosis technology for diagnosing a state of a spindle after first verifying whether the tool has been suitably changed for diagnosing the state of the spindle by considering characteristics of each tool.

The present invention provides a machining center spindle diagnosis apparatus and method configured to monitor a change of a tool in the machining center; when the change of the tool is recognized, control the machining center to idle the spindle; acquire sensor data from a sensor installed on the machining center during the idling of the spindle; input the acquired sensor data to a tool verifying model pre-trained by a machine learning technology to verify suitability of the tool; and when the tool is verified to be suitable, inputting the acquired sensor data to a spindle diagnosing model pre-trained by the machine learning technology to diagnose an operating state of the spindle.

The configuration and operation of the present invention will become clearer through specific embodiments described below with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Terms used in the description below are for explaining embodiments rather than limiting the present invention. Unless otherwise stated, a singular form includes a plural form in the present specification. In addition, the terms "including (comprise, comprising, and the like)" used herein denote the presence of stated components, steps, operations, and/or elements and do not preclude the presence or addition of one or more other components, steps, operations, and/or elements.

Figure 1A:
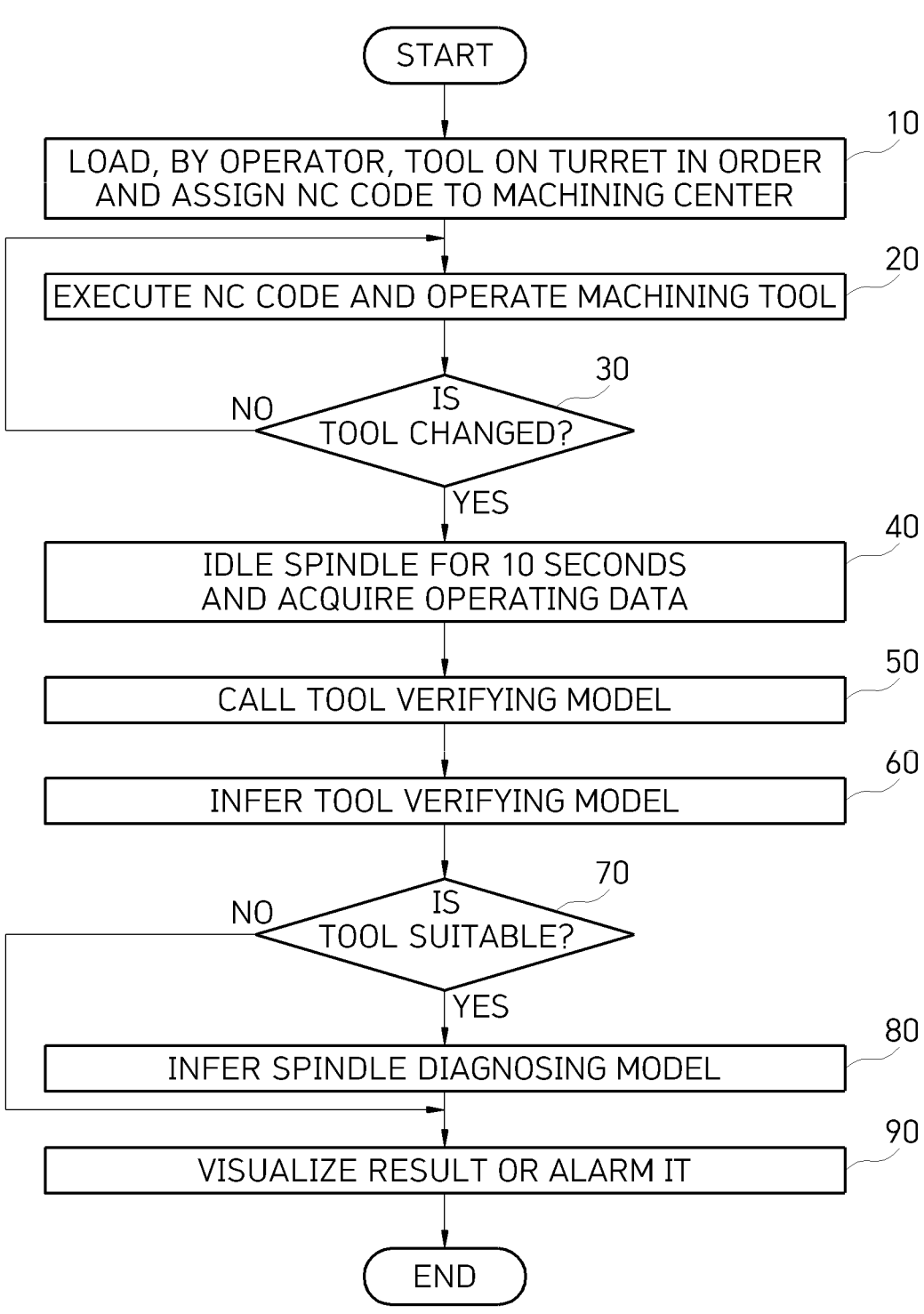
FIGS. 1A and 1B are flowcharts for describing the concept of machining center spindle diagnosis according to the present invention.
Figure 1B:
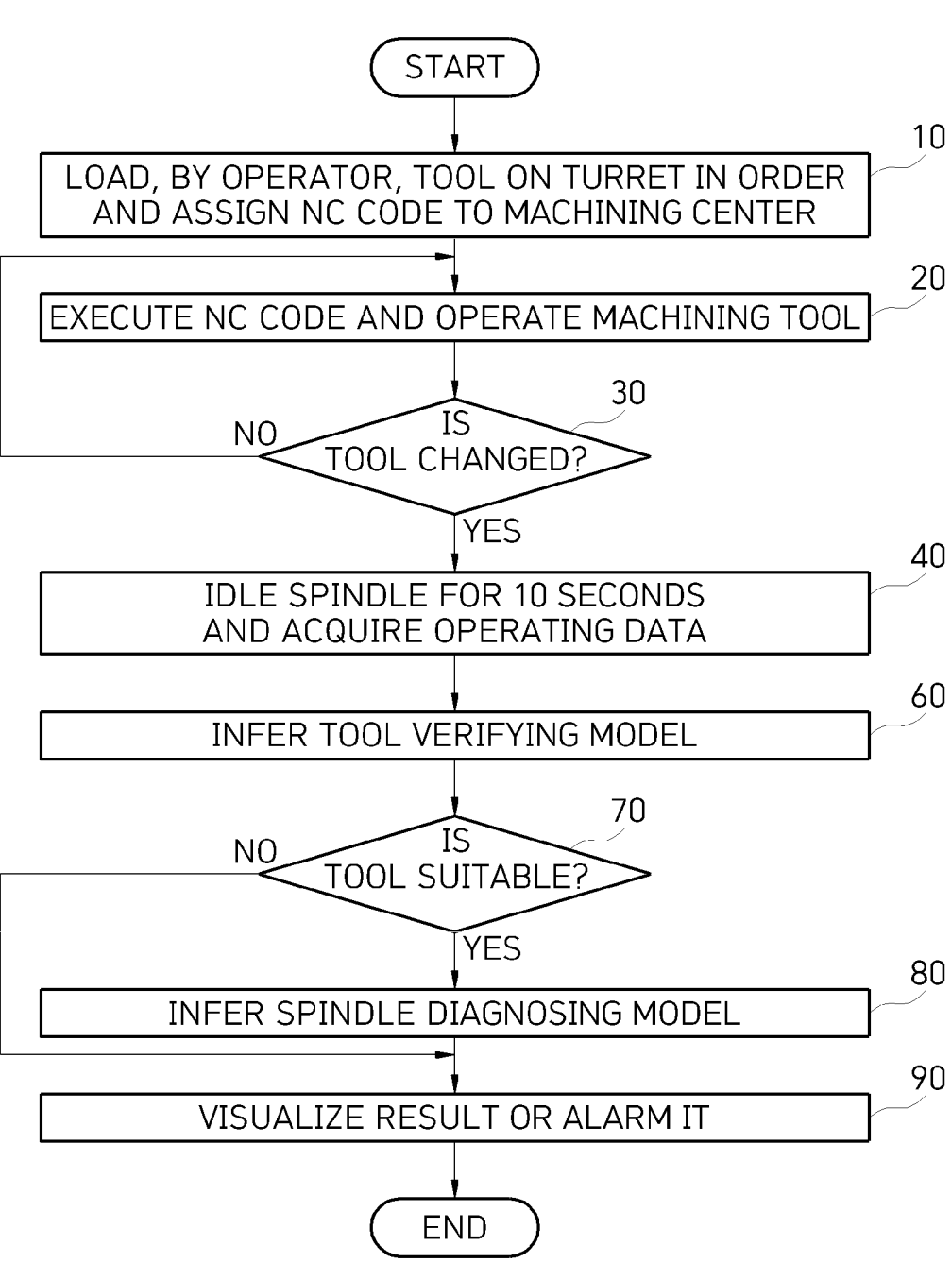

FIGS. 1A and 1B are flowcharts for describing the concept of machining center spindle diagnosis according to the present invention.

First, referring to FIG. 1A, a machining center operator loads necessary tools on a turret or a tool changer according to NC code for machining a workpiece in the order set in the NC code, and assigns the NC code to a machining center (10). The machining center processes the workpiece by executing the assigned NC code (20).

Thereby, the machining center will change the tool according to an operation set in the NC code during a machining process, and the diagnosis apparatus of the present invention monitors whether the tool of the machining center is changed (30). Whether the tool is changed in the machining center can be recognized by reading the set value of the NC code.

When the tool change is recognized, the diagnosis apparatus of the present invention issues a command to the machining center to idle the spindle at a specific speed (e.g., 2000 RPM) for a specific period (e.g., 10 seconds) (40). Sensor data (e.g., vibration pattern, frequency, amplitude, noise, motor temperature, motor current, etc.) is acquired from either sensors (e.g., vibration sensor, acceleration sensor, noise sensor, etc.) installed on the spindle of the machining center during idling (i.e., which means operating the spindle without machining a workpiece) or sensors (e.g., temperature sensor, current sensor, etc.) installed on spindle-related components (e.g., motor, wire harness, etc.) (40).

Figure 1C:
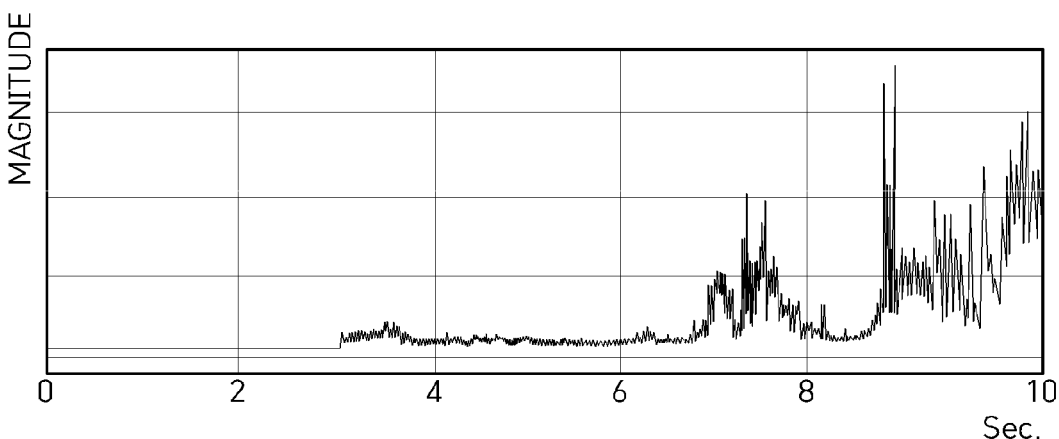
FIG. 1C is an exemplary view of a vibration pattern collected as sensor data.

A vibration pattern collected as sensor data is illustrated in FIG. 1C. It is possible to verify the suitability of the tool and diagnose the state of the spindle by inferring through an artificial intelligence neural network that has learned the change in the vibration pattern for 10 seconds. Looking at the vibration pattern of FIG. 1C, it can be seen that there is little change in vibration at the beginning, and the amount of vibration gradually increases as time passes.

The NC code is checked to call a verification model for the pre-learned tool to verify the currently changed tool (50). The tool verifying model may be a learning and inference model that is constructed by being pre-trained by a machine learning technology, such as deep learning, pattern matching, etc., with operating data (e.g., vibration pattern, frequency, amplitude, etc.) generated when the tool loaded or mounted on the spindle operates.

The tool is verified by inputting the sensor data acquired in step 40 to the tool verifying model (60).

When it is determined that the currently changed tool is not one that matches the NC code, the machining center may be stopped, or in order to notify the operator, this situation may be visualized, or an alarm etc. may be executed (90). On the other hand, when the tool is verified to be suitable (70), the sensor data acquired in step 40 is input to a machine learning model for spindle diagnosis (hereinafter, referred to as a spindle diagnosing model) to diagnose the current operating state (states such as normal, dangerous, or faulty) of the spindle (80).

A diagnosis result may be visualized so that it may be seen by an operator, or executed through an alarm or the like (90). As described in step 60 above, a tool verification result may also be output at this time or at another time.

Meanwhile, step 50 in FIG. 1A, that is, a step of calling a tool verifying model corresponding to the currently changed tool, may be omitted. That is, as illustrated in FIG. 1B, when verifying models for various tools are integrally constructed and the suitability of the current tool is inferred and verified from this integrated verifying model, there is no need to call the tool verifying model corresponding to the currently changed tool.

Figure 2A:
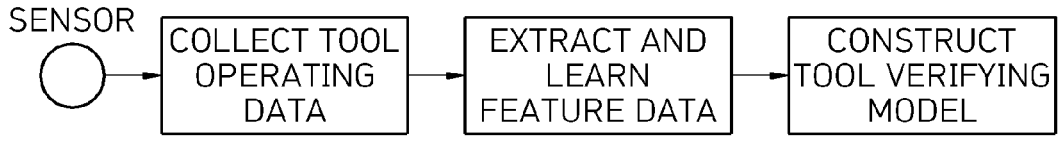
FIGS. 2A and 2B are diagrams for describing the construction of a tool verifying model.
Figure 2B:
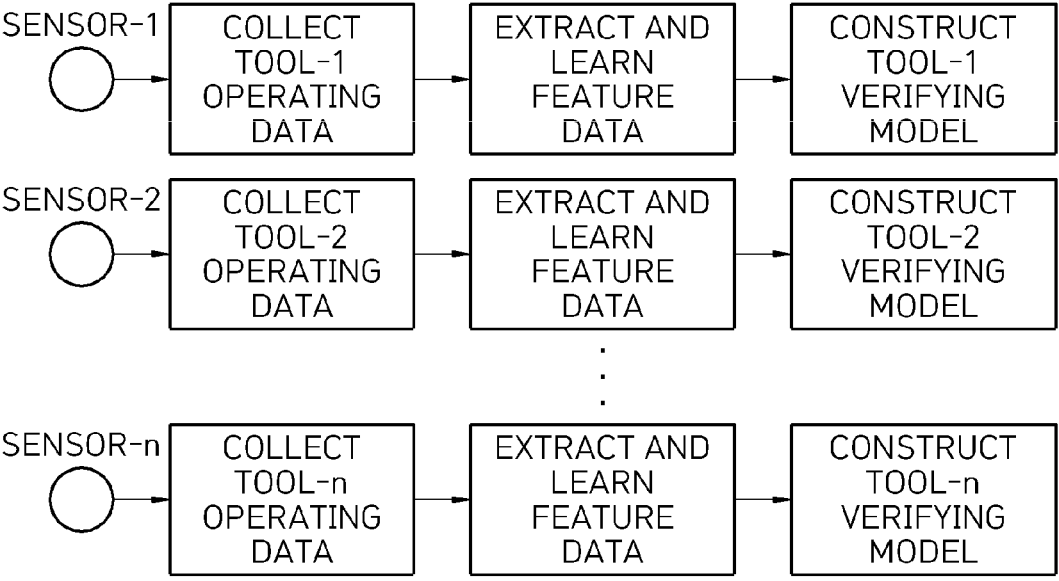

FIGS. 2A and 2B are diagrams for describing the construction of a tool verifying model.

As described above, the tool verifying model is a machine learning model for verifying whether a tool is properly changed to one assigned in the NC code during the machining of the workpiece in the machining center. The operating data (e.g. vibration pattern, frequency, amplitude, etc.) generated when a tool to be verified is operated by the spindle is acquired from vibration/acceleration/noise sensors. The tool operating data includes unique feature data according to the weight, center, eccentricity, shape, etc. of each tool. The tool verifying model is constructed by extracting feature data for machine learning from the tool operating data acquired by the sensor(s) and training a neural network. Labeling at the time of training may be set to tool suitability or unsuitability.

FIG. 2A illustrates that a single integrated tool verifying model is constructed for all types of tools that may be used in the machining center, and FIG. 2B illustrates that separate tool verifying models are constructed for each type of tool.

Referring to FIG. 2B, unlike FIG. 2A, it can be seen that a tool-1 verifying model, a tool-2 verifying model, . . . , a tool-n verifying model are separately constructed. For reference, in the description of FIG. 1A, the step of calling the tool verifying model corresponding to the current tool has been described in step 50. In addition, it has been described that, as illustrated in FIG. 2A, the calling step may be omitted when the verifying models for various types of tools are integrally constructed and the current tool is verified in the integrated verifying model.

Figure 3A:
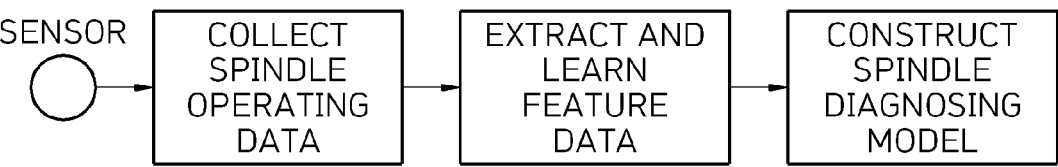
FIGS. 3A and 3B are diagrams for describing the construction of a spindle diagnosing model.
Figure 3B:
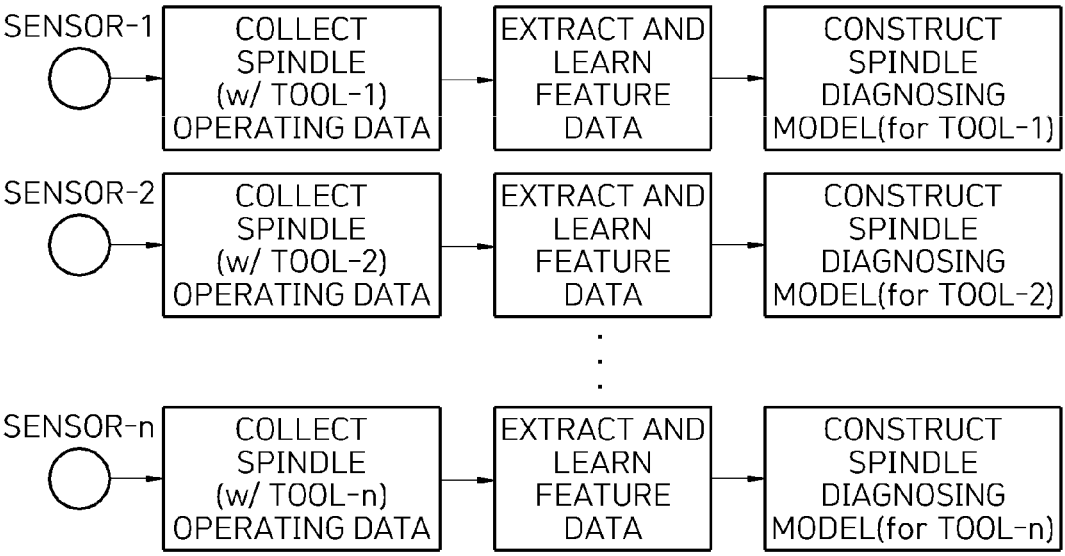

FIGS. 3A and 3B are diagrams for explaining the construction of the spindle diagnosing model.

As described above, the spindle diagnosing model is a machine learning model for diagnosing an operating state (e.g., states such as faulty, dangerous, or normal) of a spindle equipped with a tool used for machining a workpiece in the machining center. The operating data (e.g. vibration pattern, frequency, amplitude, noise, motor temperature, motor current, etc.) generated when a tool to be diagnosed operates is acquired from vibration/acceleration/noise/temperature/current sensors. The spindle diagnosing model is constructed by extracting the feature data for machine learning from the spindle operating data acquired by the sensors and training the neural network. The labeling at the time of the training may be set to three labels of a normal, dangerous, and faulty spindle (in another embodiment, the spindle may be labeled as normal and faulty).

The tool verifying model and the spindle diagnosing model may be constructed using a random forest model. The feature data is extracted from sensor data, and the whole features may be used but in order to actually apply the features in the real field, it is desirable to reduce a size of input data by selecting data that has a great effect on the inference result. To this end, after generating a random forest model with the whole feature data, the feature importance is calculated and the top 5 ranking features are selected to recreate the random forest model.

Similar to the tool verifying model, the spindle diagnosing model may also be constructed as an integrated spindle diagnosing model for all tools available for the spindle as illustrated in FIG. 3A, or as illustrated in FIG. 3B, a spindle diagnosing model may be constructed for each individual tool loaded or mounted on the spindle (a spindle diagnosing model for tool-1, a spindle diagnosing model for tool-2, . . . , a spindle diagnosing model for tool-n, in FIG. 3B).

Figure 4A:
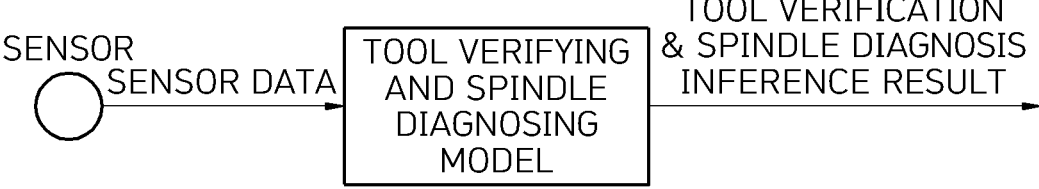
FIGS. 4A and 4B are diagrams illustrating another method of constructing and inferring a learning model.
Figure 4B:
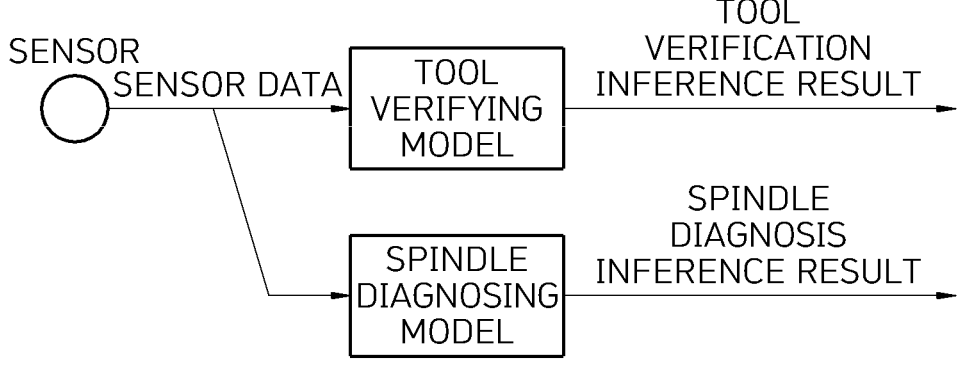

FIGS. 4A and 4B illustrate another learning model construction and inference method. As described above, FIG. 4A illustrates a method of separately constructing a tool verifying model and a spindle diagnosing model and then separately using each model for tool verification and spindle diagnosis inference, and FIG. 4B illustrates a method of constructing tool verification and spindle diagnosis as an integrated learning model and using a single model for tool verification and spindle diagnosis inference. According to the method of FIG. 4A, there is a burden of constructing and maintaining individual models, but there are benefits such as the reduction of learning and inference time and reduction of a failure rate, and the method of FIG. 4B has advantages and disadvantages opposite to those of FIG. 4A and in particular, has a disadvantage that the learning and inference process becomes complicated.

Figure 5A:
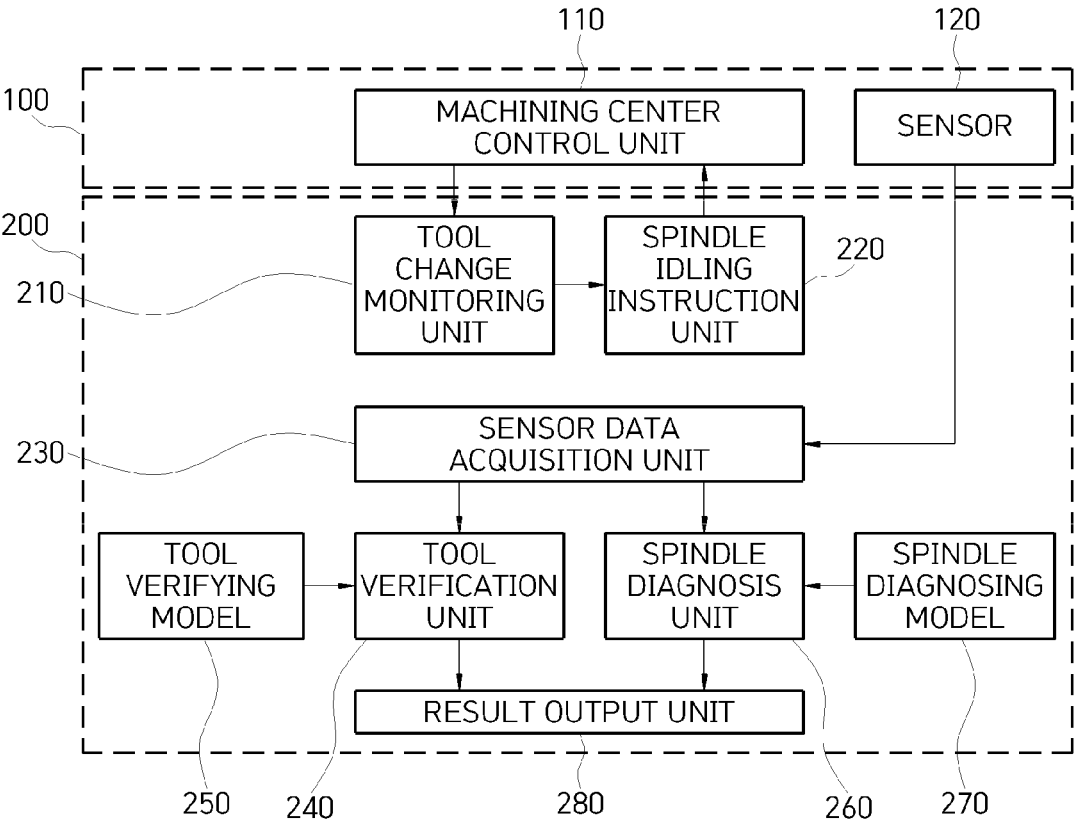
FIG. 5A is a configuration diagram of an apparatus for machine center tool verification and spindle diagnosis according to an exemplary embodiment of the present invention.

FIG. 5A is a block diagram of an apparatus for machine center tool verification and spindle diagnosis according to an exemplary embodiment of the present invention. Contents overlapping with those described above may be applied to the following contents without detailed explanation. Conversely, the newly described contents in the following description may also be applied to the previous description content.

A spindle diagnosis apparatus 200 is connected to a machining center 100 to communicate with a machining center control unit 110, and receives sensor data from a sensor 120 installed on the machining center 100. The machining center control unit 110 executes the NC code to process a workpiece. As described above, the sensor 120 may be installed on the spindle or related components (e.g., spindle driving motor, wire harness, etc.) thereof.

The spindle diagnosis apparatus 200 includes the following components.

A tool change monitoring unit 210 that monitors whether a tool is changed according to an operation type set in NC code from the machining center control unit 110. Whether the tool is changed in the machining center 100 can be known by reading the set value of the NC code through the machining center control unit 110.

When the tool change is recognized, a spindle idling instruction unit 220 issues a command to the machining center control unit 110 to idle the spindle at a specific speed (e.g., 2000 RPM) for a specific period (e.g., 10 seconds) (here, to idle means operating the spindle without machining the workpiece)—, A sensor data acquisition unit 230 that acquires sensor data (e.g., vibration pattern, frequency, amplitude, noise, motor temperature, motor current, etc.) from either sensors (a vibration sensor, an acceleration sensor, a noise sensor, etc.) installed on the spindle for the machining center during the idling of the spindle or sensors (a temperature sensor, a current sensor, etc.) installed on spindle-related components (e.g., a motor, a wire harness, etc.)—, A tool verification unit 240 that verifies the currently changed tool by inputting the acquired sensor data into a tool verifying model 250. Here, an inference result of the tool verifying model 250 may be divided into two categories, suitability/unsuitability. When the inference result is suitable (i.e., the current tool matches what is assigned in the NC code), the diagnosis of the spindle may be executed by a spindle diagnosis unit 260 to be described below, and when the inference result is not suitable, a command is issued to the machining center control unit 110 to stop the operation of the machining center (to this end, a machining center operation stop unit, which is not illustrated, may be added to the configuration of FIG. 5), or may be output through a result output unit 280 to notify the operator of it.

A spindle diagnosis unit 260 that inputs the acquired sensor data to a spindle diagnosing model 270 to diagnose a state of the spindle. Here, the state of the spindle may be diagnosed into three categories, Normal, Dangerous, and Faulty, or two categories, Normal and Faulty. The inference result of the spindle diagnosing model 270 may be classified into each category using threshold values set for each category.

A result output unit 280 that outputs verification and/or diagnosis results of the tool verification unit 240 and/or spindle diagnosis unit 260. A signal output from the result output unit 280 may be output as a video signal for visually notifying an operator, an auditory audio signal, or the like, and a separate display may be connected, or the result output unit 280 may perform a display function by itself.

Meanwhile, a configuration of a modified embodiment in which some elements are added to the configuration of FIG. 5A described above will be described with reference to FIG. 5B.

If tool verifying models are individually constructed for each tool as in the case of FIG. 2B, a tool verifying model selection unit 245 may be added to select and call a verifying model corresponding to the currently changed tool by checking the NC code.

In addition, as in the case of FIG. 3B, if spindle verifying models are individually constructed for each tool, a spindle diagnosing model selection unit 265 that selects and calls a spindle diagnosing model corresponding to the currently changed tool on the spindle may be added.

Figure 5B:
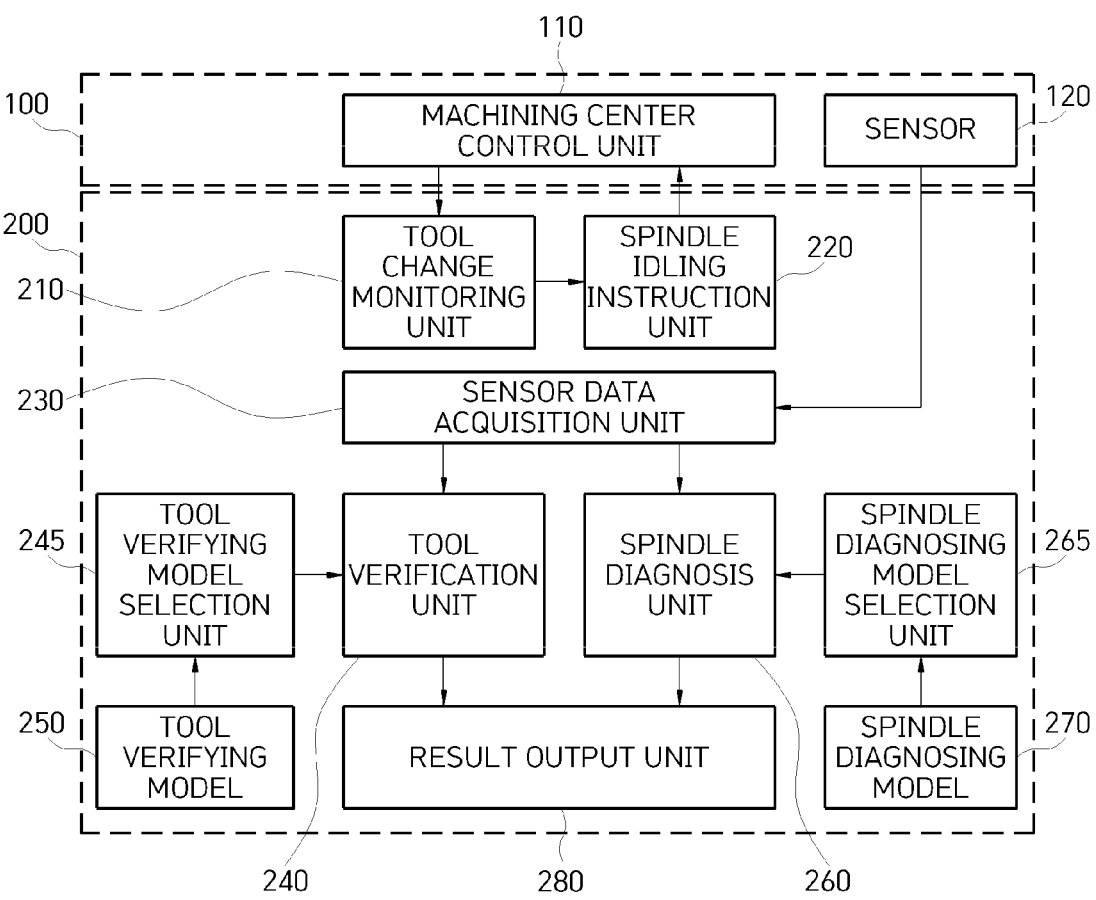
FIG. 5B is a configuration diagram of a modified embodiment in which some elements are added to the configuration of FIG. 5A.
Figure 6:
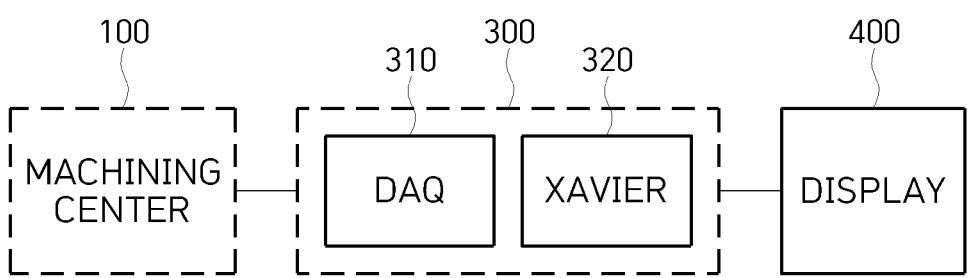
FIG. 6 is a configuration diagram of implementing the apparatus and method of the present invention as a product.

FIG. 6 is a configuration diagram of a machining center spindle diagnosis apparatus according to the present invention implemented as a commercial product, i.e., implemented as an embedded system 300 using a data acquisition system (DAQ) 310 that collects data for learning and inference of the above-described configuration of FIG. 5A or FIG. 5B and NVIDIA's Xavier 320, which is a small computer with built-in artificial intelligence function. Here, an example of a configuration manufactured by connecting the machining center 100 and the display 400 is illustrated.

Figure 7:
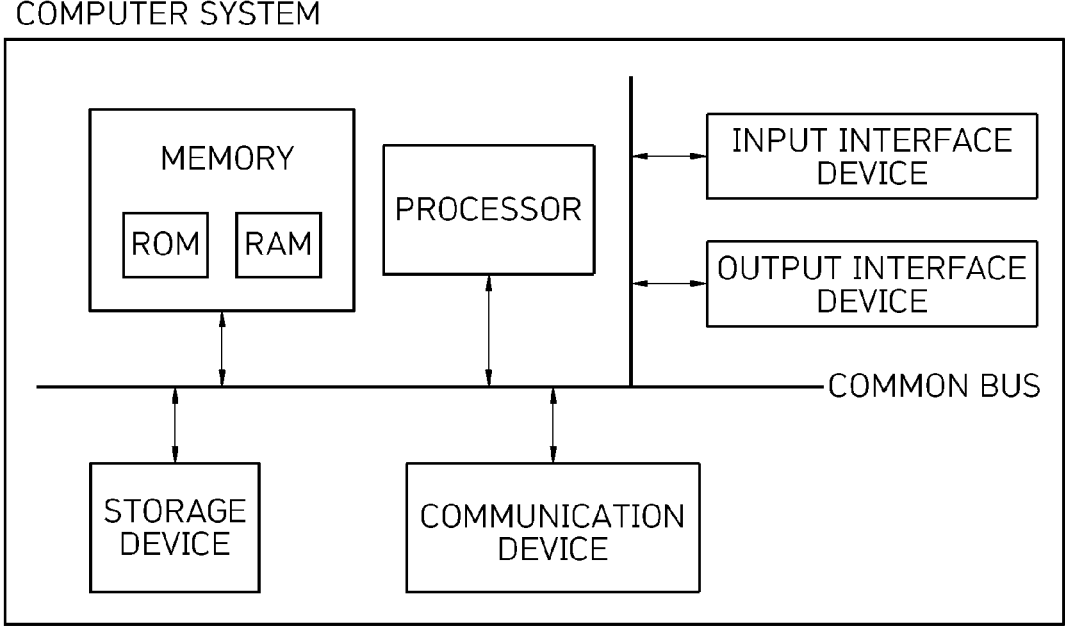
FIG. 7 is a configuration diagram of a computer system based on implementing the apparatus and method of the present invention as a product.

Meanwhile, a controller of the present invention and an algorithm programmed therein may be implemented based on a computer system illustrated in FIG. 7.

The computer system illustrated in FIG. 7 may include at least one of a processor, a memory, an input interface device, an output interface device, and a storage device that communicate via a bus. The computer system may also include a communication device coupled to a network. The processor may be a central processing unit (CPU) or a semiconductor device that executes instructions stored in a memory or storage device. The communication device may transmit or receive a wired signal or a wireless signal. The memory and the storage device may include various types of volatile or non-volatile storage media. The memory may include a read only memory (ROM) and a random access memory (RAM). The memory may be located inside or outside the processor, and may be connected to the processor through various known means.

Accordingly, the present invention may be implemented as a computer-implemented method, or as a non-transitory computer-readable medium having computer-executable instructions stored therein. In an embodiment, when executed by the processor, the computer-readable instructions may perform the method according to at least one aspect of the present disclosure.

In addition, the method according to the present invention may be implemented in the form of program commands that may be executed through various computer means and may be recorded on a computer-readable recording medium. The computer-readable recording medium may include program instructions, data files, data structures or the like, alone or in combination. The program instructions recorded on the computer-readable recording medium may be configured by being especially designed for the embodiment of the present invention, or may be used by being known to those skilled in the field of computer software. The computer-readable recording medium may include a hardware device configured to store and execute the program instructions. Examples of the computer-readable recording medium may include a magnetic medium such as a hard disk, a floppy disk, and a magnetic tape, an optical medium such as a compact disc read only memory (CD-ROM) or a digital versatile disc (DVD), a magneto-optical medium such as a floptical disk, a ROM, a RAM, a flash memory, or the like. Examples of the program instructions may include high-level language code capable of being executed by a computer using an interpreter, or the like, as well as machine language code made by a compiler.

The present invention targets a machining center that changes tools according to NC code, and provides the following effects.

(1) Even when an operator loads or mounts a tool by mistake, he/she can be aware of the mistake before actual machining. As a result, it is possible to maintain the quality of a workpiece and extend the lifetime of a spindle.

(2) It is possible to diagnose a state of a spindle on which different tools are loaded or mounted. Compared to the existing method, it is possible to diagnose an optimized state for the spindle.

(3) When a tool is changed, it is possible to diagnose a state of the spindle through idling of the spindle. When sensor data collected during actual machining is used, a data pattern may change and thus the accuracy of the state diagnosis may decrease. To this end, a spindle idling routine is added and only the sensor data collected during this period is used for verification and diagnosis.

Hereinabove, embodiments in which the spirit of the present invention is specifically implemented have been described. However, the technical scope of the present invention is not limited to the above-described embodiments and drawings, but is defined by a rational interpretation of the claims.

8

What is claimed is:

1. A machining center spindle diagnosis apparatus configured to:
   monitor a change of a tool in a machining center;
   when the change of the tool is recognized, control the machining center to idle the spindle;
   acquire sensor data from a sensor installed on the machining center during the idling of the spindle;
   input the acquired sensor data to a pre-trained tool verifying model to verify suitability of the tool; and
   when the tool is verified to be suitable, input the acquired sensor data to a pre-trained spindle diagnosing model to diagnose an operating state of the spindle;
   wherein
   the pre-trained tool verifying model is a machine learning model constructed by extracting feature data for machine learning from tool operating data acquired by the sensor and training a neural network,
   the tool operating data includes at least one of vibration data, acceleration data, noise data, temperature data or current data, and
   the feature data is ranked based on feature importance.

2. The apparatus of claim 1, wherein determination of whether the tool of the machining center is changed is performed by reading a setting value of NC code.

3. The apparatus of claim 1, wherein the sensor installed on the machining center is at least one of a vibration sensor, an acceleration sensor, a noise sensor, a temperature sensor, or a current sensor.

4. The apparatus of claim 1, further configured to call a verifying model for a tool changed in a current machining center to input the sensor data to the tool verifying model.

5. The apparatus of claim 1, further configured to verify the suitability of the tool and stop the machining center when the tool is not suitable.

6. The apparatus of claim 1, wherein the tool verifying model is an integrated tool verifying model constructed for multiple types of tools that are used in the machining center.

7. The apparatus of claim 1, wherein the tool verifying model is a tool verifying model constructed individually for each tool that is used in the machining center.

8. The apparatus of claim 1, wherein the spindle diagnosing model is an integrated spindle diagnosing model constructed for a plurality of tools mountable on the spindle.

9. The apparatus of claim 1, wherein the spindle diagnosing model is a spindle diagnosing model constructed individually for each tool mountable on the spindle.

10. The apparatus of claim 1, wherein the tool verifying model and the spindle diagnosing model are constructed separately and used for the tool verification and spindle diagnosis individually.

11. The apparatus of claim 1, wherein the tool verifying model and the spindle diagnosing model are constructed as an integrated tool verification and spindle diagnosing model and used for the tool verification and spindle diagnosis.

12. The apparatus of claim 7, further configured to select and call a tool verifying model corresponding to a currently changed tool.

13. The apparatus of claim 9, further configured to select and call a spindle diagnosing model corresponding to a spindle on which a currently changed tool is mounted.

14. A machining center spindle diagnosis method comprising:
   monitoring a change of a tool in the machining center;
   when the change of the tool is recognized, controlling the machining center to idle the spindle;
   acquiring sensor data from a sensor installed on the machining center during the idling of the spindle;

inputting the acquired sensor data to a pre-trained tool verifying model to verify suitability of the tool; and when the tool is verified to be suitable, inputting the acquired sensor data to a pre-trained spindle diagnosing model to diagnose an operating state of the spindle;

wherein the pre-trained tool verifying model is a machine learning model constructed by extracting feature data for machine learning from tool operating data acquired by the sensor and training a neural network, the tool operating data includes at least one of vibration data, acceleration data, noise data, temperature data or current data, and the feature data is ranked based on feature importance.

15. The method of claim 14, wherein determination of whether the tool of the machining center is changed is performed by reading a setting value of an NC code.

16. The method of claim 14, further comprising calling a verifying model for a tool changed in a current machining center to input the sensor data to the tool verifying model.

17. The method of claim 14, further comprising verifying the suitability of the tool and stopping the machining center when the tool is not suitable.

18. The method of claim 14, wherein the tool verifying model is constructed individually for each tool that is used in the machining center, and the method further comprising selecting and calling a tool verifying model corresponding to a currently changed tool.

19. The method of claim 14, wherein the spindle diagnosing model is constructed individually for each tool mountable on the spindle, and the method further comprising selecting and calling a spindle diagnosing model corresponding to a spindle with a currently changed tool.

\* \* \* \* \*